(12) United States Patent
Endo

(10) Patent No.: US 10,255,221 B2
(45) Date of Patent: Apr. 9, 2019

(54) MEMORY CARD WITH COMMUNICATION FUNCTION

(71) Applicant: Toshiba Memory Corporation, Minato-ku (JP)

(72) Inventor: Shigeto Endo, Kamakura (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 0 days.

(21) Appl. No.: 15/067,981

(22) Filed: Mar. 11, 2016

(65) Prior Publication Data

US 2017/0068631 A1    Mar. 9, 2017

Related U.S. Application Data

(60) Provisional application No. 62/215,970, filed on Sep. 9, 2015.

(51) Int. Cl.
*G06F 1/16* (2006.01)
*G06F 13/40* (2006.01)
(Continued)

(52) U.S. Cl.
CPC ...... *G06F 13/4068* (2013.01); *G06K 19/07732* (2013.01); *H04B 1/3816* (2013.01); *H04W 4/80* (2018.02)

(58) Field of Classification Search
CPC .......... G06F 13/4068; H01Q 1/2283; H04B 1/3816; H01L 23/49855
See application file for complete search history.

(56) References Cited

U.S. PATENT DOCUMENTS 6,650,303 B2 * 11/2003 Kim ................. H01Q 1/243
  343/700 MS
6,717,801 B1 * 4/2004 Castell ............. G06F 1/1616
  361/679.41
(Continued)

FOREIGN PATENT DOCUMENTS

JP  2006-129003  5/2006
JP  2013-168780  8/2013
JP  2013-172220  9/2013

OTHER PUBLICATIONS

Sorrel, Charlie, Teardown: What's Inside the Eye-Fi Card, Mar. 19, 2008, Wired.com.*

*Primary Examiner* — Hoa C Nguyen
*Assistant Examiner* — Keith DePew
(74) *Attorney, Agent, or Firm* — Oblon, McClelland, Maier & Neustadt, L.L.P.

(57) ABSTRACT

A memory card provided with a communication function has a substrate having a first mounting surface and a second mounting surface on a side opposite to the first mounting surface, a memory chip mounted on the first mounting surface or the second mounting surface, a proximity wireless communication circuit on the first mounting surface or the second mounting surface, a circuit pattern which is disposed on at least one of a first area of the first mounting surface and a second area of the second mounting surface located opposite to the first area, the substrate being between the first area and the second area, and which is connected with the memory chip and the proximity wireless communication circuit, and a chip antenna mounted on a third area of the first mounting surface or a fourth area of the second mounting surface.

13 Claims, 9 Drawing Sheets

(51) Int. Cl.
*H04B 1/3816* (2015.01)
*G06K 19/077* (2006.01)
*H04W 4/80* (2018.01)

(56) References Cited

U.S. PATENT DOCUMENTS

| | | | | |
|---|---|---|---|---|
| 7,464,213 B2* | 12/2008 | Fukuda | ............... | G06K 19/077 710/301 |
| 8,254,134 B2* | 8/2012 | Hiew | ................ | H01L 21/565 235/492 |
| 9,204,477 B2* | 12/2015 | Tsumagari | ........... | G08C 17/00 |
| 9,448,918 B2* | 9/2016 | Feinberg | ................ | G06F 9/445 |
| 9,569,717 B2* | 2/2017 | Okada | ............. | G06K 19/07345 |
| 2002/0169003 A1* | 11/2002 | Jinushi | ................ | H01Q 1/22 455/558 |
| 2002/0174337 A1* | 11/2002 | Aihara | ................ | G06F 21/78 713/172 |
| 2003/0074179 A1* | 4/2003 | Ropo | ................ | G06K 19/07 703/27 |
| 2004/0196375 A1* | 10/2004 | Marshall | .......... | H04N 1/00244 348/207.1 |
| 2005/0055479 A1* | 3/2005 | Zer | ................ | G06F 13/28 710/22 |
| 2005/0235086 A1* | 10/2005 | Mills | ................ | G01C 21/20 710/301 |
| 2009/0051606 A1* | 2/2009 | Ochi | ................ | G06K 19/07732 343/702 |
| 2009/0173795 A1* | 7/2009 | Ochi | ................ | G06K 19/07732 235/493 |
| 2010/0044444 A1* | 2/2010 | Jain | ................ | G06K 7/10237 235/492 |
| 2010/0052996 A1* | 3/2010 | Ochi | ................ | G06K 19/07732 343/702 |
| 2010/0163630 A1* | 7/2010 | Ochi | ................ | G06K 19/07732 235/492 |
| 2010/0169548 A1* | 7/2010 | Kanda | ................ | G06K 17/00 711/103 |
| 2010/0264211 A1* | 10/2010 | Jain | ................ | G06F 1/1698 235/380 |
| 2010/0284680 A1* | 11/2010 | Higaki | ................ | G03B 17/24 396/310 |
| 2011/0019007 A1* | 1/2011 | Elazar | ................ | G06F 17/30244 348/207.1 |
| 2011/0032174 A1* | 2/2011 | Sinnett | ................ | B60C 23/0493 343/885 |
| 2011/0128207 A1* | 6/2011 | Arimura | .......... | G06K 19/07743 343/906 |
| 2011/0185098 A1* | 7/2011 | Kim | ................ | G06K 19/07743 710/301 |
| 2012/0274534 A1* | 11/2012 | Pan | ................ | H01Q 21/30 343/843 |
| 2013/0099999 A1* | 4/2013 | Christie | ................ | H01Q 1/243 343/895 |
| 2014/0015726 A1* | 1/2014 | Christie | ................ | H01Q 1/243 343/790 |
| 2014/0025795 A1* | 1/2014 | Fiennnes | ............ | H04N 21/4126 709/222 |
| 2016/0020829 A1* | 1/2016 | Maor | ............... | G06K 19/07732 375/219 |

* cited by examiner

MEMORY CARD WITH COMMUNICATION FUNCTION

CROSS REFERENCE TO RELATED APPLICATIONS

This application is based upon and claims the benefit of priority from the prior US Provisional Patent Application No. 62/215,970 filed on Sep. 9, 2015, the entire contents of which are incorporated herein by reference.

FIELD

The present invention relates to a memory card provided with a communication function.

BACKGROUND

In recent years, highly-functional cellular phones and smart phones provided with proximity wireless communication functions have become widely used. However on the other hand, demands for low-cost cellular phones and smart phones with minimum necessary functions also have increased.

Although a low-cost and lowly-functional cellular phone or smart phone of this type itself often has no proximity wireless communication function, the phone becomes capable of proximity wireless communication by insertion of a memory card having a proximity wireless communication function into a card slot.

For proximity wireless communication by a memory card, a chip antenna needs to be mounted on a substrate in the memory card. However, circuit components and circuit patterns are formed on the substrate, which blocks a magnetic flux from the coil in the chip antenna and thus the radio field intensity may considerably deteriorate depending on the orientation of the cellular phone or smart phone.

DETAILED DESCRIPTION

Hereinafter, embodiments of the present invention will be described with reference to the drawings.

(First Embodiment)

Figure 1A:
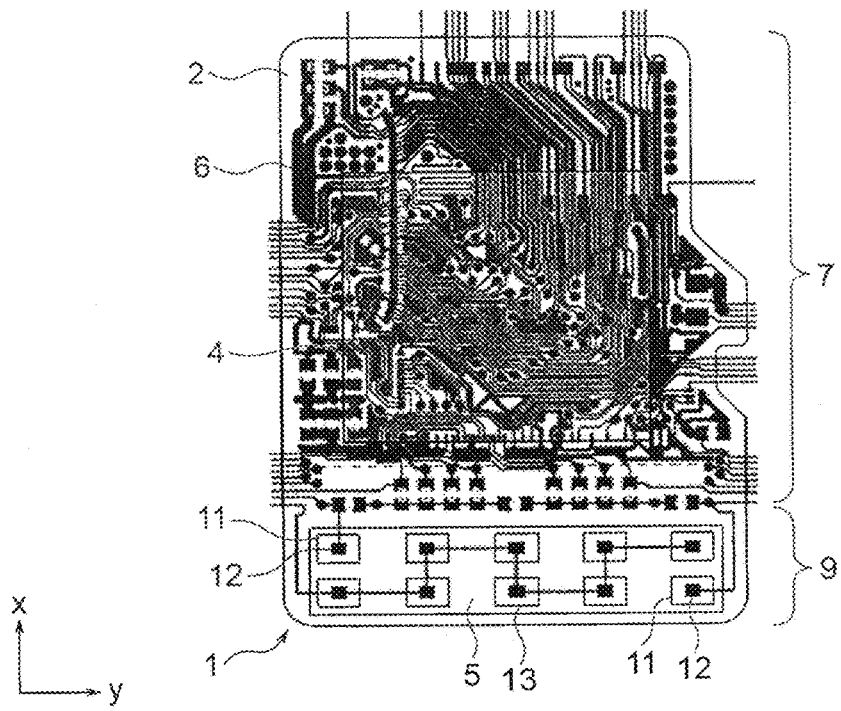
FIG. 1A is a layout diagram showing a first mounting surface of a substrate in a memory card of a first embodiment.
Figure 1B:
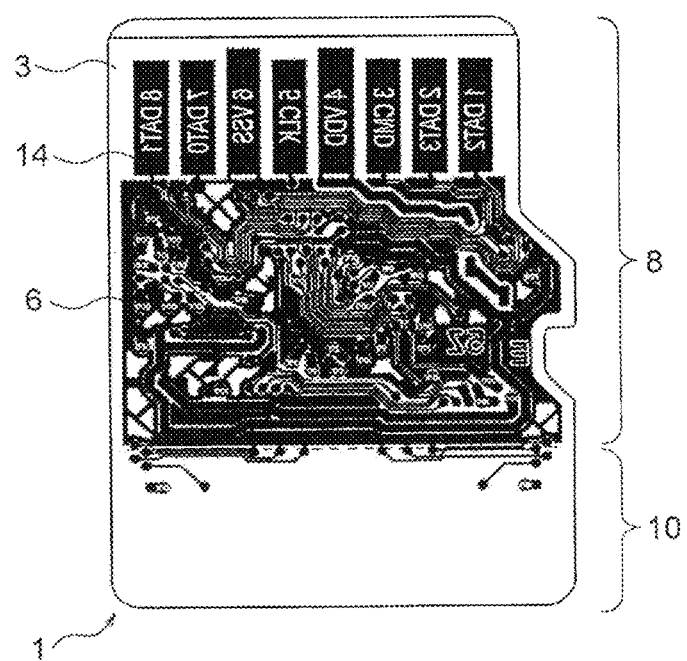
FIG. 1B is a layout diagram showing a second mounting surface located on the side opposite to the first mounting surface.

FIG. 1A is a layout diagram showing a first mounting surface 2 of a substrate 1 in a memory card of a first embodiment, and FIG. 1B is a layout diagram showing a second mounting surface 3 located on the side opposite to the first mounting surface 2. FIG. 1B is a layout diagram of a view seen through the memory card from its front surface side. The memory card in FIGS. 1A and 1B is a SD card for example.

As shown in FIG. 1A, the memory card is provided with a substrate 1 having a first mounting surface 2 and a second mounting surface 3 on the side opposite to the first mounting surface 2. The first mounting surface 2 of the substrate 1 hereinafter is also called the front surface and the second mounting surface 3 is also called the rear surface.

A memory chip 4 and a chip antenna 5 are mounted on the substrate 1. Further, a circuit pattern 6 and various types of circuit components are arranged on the substrate 1. The circuit pattern 6 and the circuit components are arranged on at least one of a first area 7 of the first mounting surface 2 of the substrate 1 and a second area 8 of the second mounting surface 3 arranged opposite to the first area 7 through the substrate 1. The chip antenna 5 is mounted on a third area 9 of the first mounting surface 2 of the substrate 1 or a fourth area 10 of the second mounting surface 3 arranged opposite to the third area 9 through the substrate 1.

Here, the circuit components include various types of IC chips and in addition, may include discrete components such as a transistor, capacitor or resistance element.

One of the IC chips mounted on the first area 7 or the second area 8 is a memory chip 4. In the example in FIG. 1A, the memory chip 4 is mounted on the first area 7. The outline dimension of the memory chip 4 is smaller than that of the first area 7 and the memory chip 4 is mounted so as not to protrude from the first area 7. The memory chip 4 and the circuit pattern 6 on the first area 7 are connected with bonding wires for example. The pins of the memory chip 4 may be connected with pads 11 on the circuit pattern 6 on the first area 7 with solder bumps or other methods instead of the bonding wires.

IC chips other than the memory chip 4 may be directly mounted on the first area 7 or the second area 8, or may be mounted on the upper surface (the surface on the side opposite to the first mounting surface 2) of the memory chip 4. The IC chip mounted on the upper surface of the memory chip 4 is connected with the circuit pattern 6 on the first area 7 where the memory chip 4 is mounted for example, with bonding wires. Alternatively, the IC chip may be mounted on the upper surface of the memory chip 4 by use of solder bumps or other methods.

The memory chip 4 has a built-in nonvolatile memory such as a NAND flush memory. A memory controller for controlling access to the nonvolatile memory may be built in the memory chip 4 or may be an IC chip different from the memory chip 4.

Other than this, an IC chip having a proximity wireless communication function is mounted on the first area 7 or the second area 8. The detailed wireless system of the proximity wireless communication function built in the IC chip is not restricted. An IC chip having any proximity wireless communication function such as Near Field Communication (NFC), Bluetooth and TransferJet can be mounted. A circuit having a proximity wireless communication function may be mounted on the circuit pattern 6 by the use of a discrete component instead of an IC chip having a proximity wireless communication function. In the description of the present application, IC chips and circuits each having a proximity wireless communication function are named proximity wireless communication circuits generically.

The chip antenna 5 is mounted on the third area 9 of the first mounting surface 2 or on the fourth area 10 of the second mounting surface 3. In the example in FIG. 1A, the chip antenna 5 is mounted on the third area 9. The circuit pattern 6 is basically not mounted on the third area 9 or the fourth area 10. However, the chip antenna 5 needs to be supplied with electric power by means of a signal from the circuit pattern 6. In the case of FIG. 1A, a pattern for supplying electric power extends to the third area 9 from the circuit pattern 6. This pattern for supplying electric power is connected with two pads 11 on the third area 9. On the other hand, the chip antenna 5 has two terminals 12 as terminals for supplying electric power. These two terminals 12 are connected with the corresponding pads 11. Due to this, the chip antenna 5 is supplied with electric power by means of a signal from the circuit pattern 6 on the first area 7. The internal configuration of the chip antenna 5 will be described later.

Further, a plurality of dummy pads 13 are provided on the third area 9 on which the chip antenna 5 is mounted. These dummy pads 13 have no relationship with the signal transmission or power supply of the memory card and are provided for increasing the joining strength of the chip antenna 5 to the first mounting surface 2. The dummy pad 13 and the chip antenna 5 are connected with a solder bump or other methods.

As described above, conductive members, which block a magnetic flux from the chip antenna 5, are not disposed as much as possible, on the third area 9 of the first mounting surface 2 and the fourth area 10 of the second mounting surface 3 opposite to the third area 9 through the substrate 1.

As shown in FIG. 1B, a plurality of connectors 14 are arranged along a side end of the second area 8 of the second mounting surface 3 of the substrate 1 in the memory card. The connectors 14 have shapes and arrangement according to the standard of the SD card for example. The circuit pattern 6 connected with the connectors 14 is arranged on the second area 8 and circuit components may be mounted as needed.

Although, as described above, the second area 8 is located opposite to the first area 7 of the first mounting surface 2 through the substrate 1, the size of the first area 7 is not necessarily the same as that of the second area 8. Similarly, although the fourth area 10 of the second mounting surface 3 is located opposite to the third area 9 of the first mounting surface 2 through the substrate 1, the size of the third area 9 is not necessarily the same as that of the fourth area 10.

The circuit pattern 6 is basically not disposed on the fourth area 10 and any conductive circuit components are not disposed thereon either. To be specific, conductive members, which block a magnetic flux from the chip antenna 5, are not disposed on the fourth area 10 as much as possible.

The third area 9 of the first mounting surface 2 and the fourth area 10 of the second mounting surface 3 are located farther away from the connectors 14 than the first area 7 of the first mounting surface 2 or the second area 8 of the second mounting surface 3. Since a portion on the side near the connectors 14 is housed inside the electric device such as a cellular phone or smart phone when the memory card is inserted into the card slot of the electric device, the magnetic flux from the coil in the chip antenna 5 has a risk to be blocked by the electronic device body. Thus, by disposing the chip antenna 5 as far away as possible from the connectors 14, it is possible to prevent the magnetic flux from the coil in the chip antenna 5 from being blocked. Further, by disposing circuit components such as the memory chip 4 as near as possible to the connectors 14, it is possible to speed up the signal transmission through the connectors 14. Because of these reasons, the chip antenna 5 is disposed on the third area 9, which is farthest away from the connectors 14 and conductive members are prevented from being disposed on the fourth area 10 as much as possible in the example in FIG. 1A.

More specifically, a density of the circuit pattern in the third area 9 and the fourth area 10 are lower than a density of the circuit pattern in the first area 7 and the second area 8. At least one circuit component is mounted on at least one of the first area 7 and the second area 8 except for the third area 9 and the fourth area 10. In this way, the third area 9 or the fourth area 10 are mainly provided to mount the chip antenna 5

Figure 2:
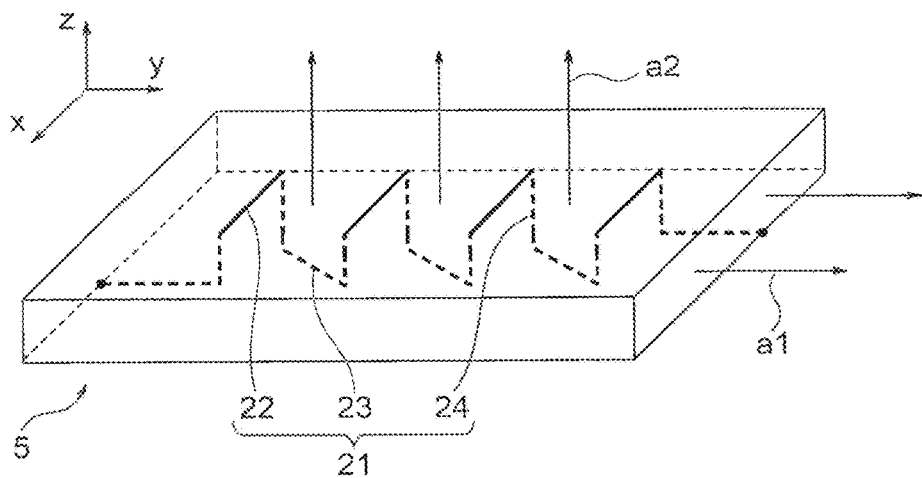
FIG. 2 is a perspective view showing a chip antenna.

FIG. 2 is a perspective view showing the chip antenna 5. The chip antenna 5 is in a cube shape for example and a coil 21 formed of a spiral pattern is provided inside the chip antenna 5. In FIG. 2, it is assumed that x denotes the lateral direction, y denotes the longitudinal direction and z denotes the height direction of the chip antenna 5.

A plurality of patterns 22 that are on the upper surface of the coil 21 are laid substantially parallel to the lateral direction x of the upper surface at predetermined intervals. A plurality of patterns 23 that are on the lower surface of the coil 21 are laid in a direction inclined from the lateral direction x and the longitudinal direction y of the lower surface at predetermined intervals.

These patterns 22 on the upper surface and patterns 23 on the lower surface are connected by patterns 24 extending in the direction z normal to the upper and lower surfaces. The coil 21 is composed of these patterns 22 to 24.

The majority of magnetic flux making a linkage with the coil 21 circulates in the longitudinal direction y of the chip antenna 5 as shown with the arrow line a1. Further since the patterns on the lower surface of the chip antenna 5 extend in a direction inclined from the lateral direction x and longitudinal direction y, part of magnetic flux making a linkage with the coil 21 circulates also in the direction normal to the upper and lower surfaces of the chip antenna 5 as shown with the arrow line a2.

The magnetic flux circulating in the direction y in FIGS. 1A and 1B, has no risk of being blocked by the circuit pattern 6 or circuit components on the first mounting surface 2 or the second mounting surface 3. In the present embodiment, as shown in FIGS. 1A and 1B, since the circuit pattern 6 or the circuit components other than the chip antenna 5 are prevented from being disposed on the third area 9 of the first mounting surface 2 and the fourth area 10 of the second mounting surface 3 as much as possible, almost no magnetic flux circulating in the direction z (front-back direction of the drawing sheet) is subjected to the blockage.

Figure 3:
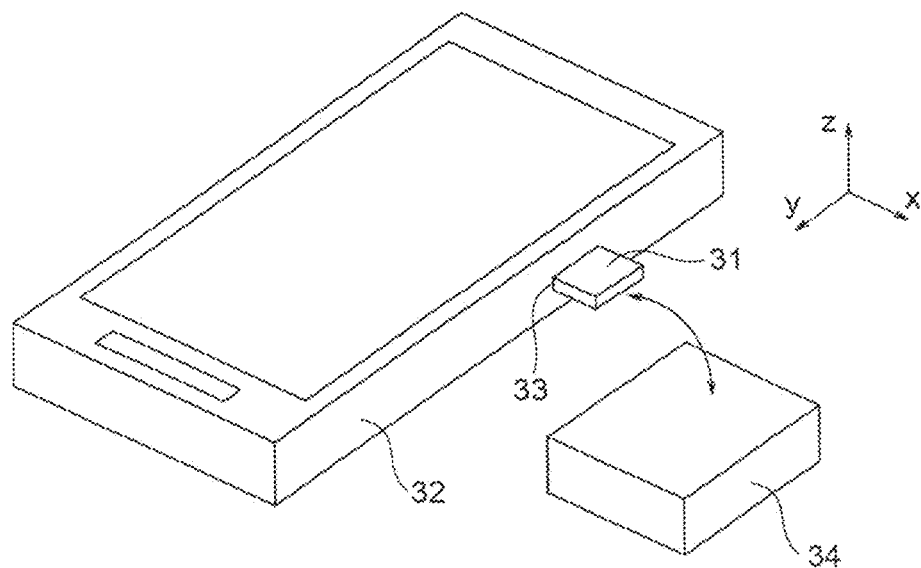
FIG. 3 is a diagram showing a state of an electronic device held toward a communication device.

Hence, as shown in FIG. 3, even when electronic device 32 such as a cellular phone and a smart phone with the memory card 31 of the present embodiment inserted into the card slot 33 thereof is moved in the direction z in FIG. 3 to approach the communication device 34 for proximity wireless communication, stable proximity wireless communication can be executed at a communication distance similar to that in the case where the electronic device 32 is moved in the direction x or y to approach the communication device 34.

Figure 4A:
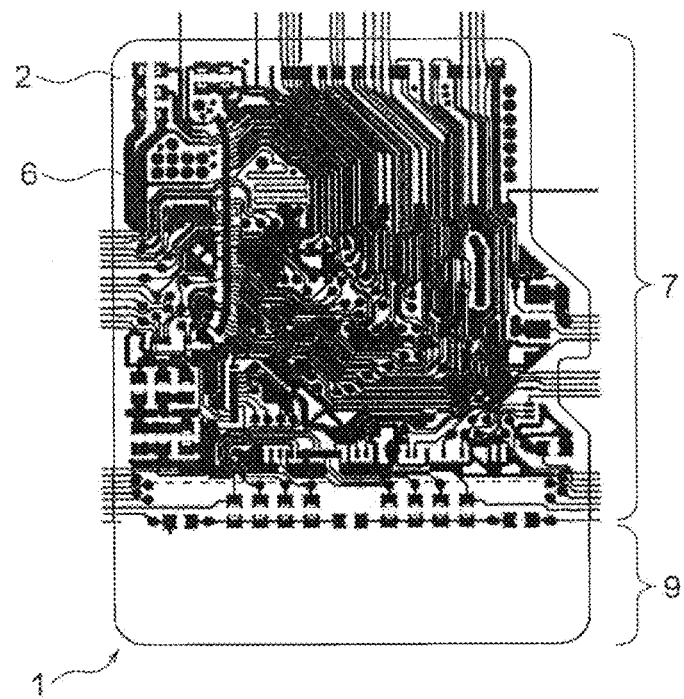
FIG. 4A is a layout diagram showing a first modification example of the mounting surface in FIG. 1A.
Figure 4B:
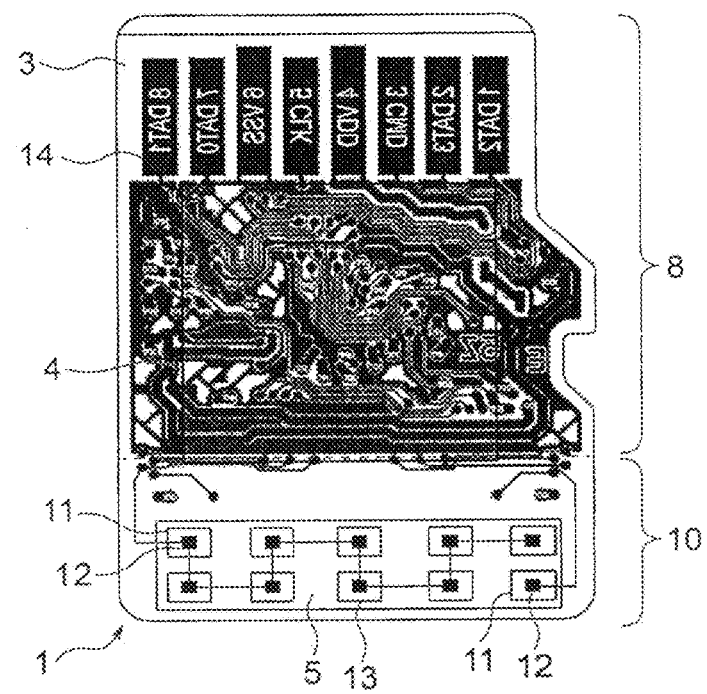
FIG. 4B is a layout diagram showing a first modification example of the mounting surface in FIG. 1B.

Although FIGS. 1A and 1B show an example in which the memory chip 4 and chip antenna 5 are mounted on the first mounting surface 2 of the substrate 1, as shown in FIGS. 4A and 4B, the memory chip 4 and chip antenna 5 may be disposed on the second mounting surface 3 of the substrate 1. In this case, the memory chip 4 is mounted on the second area 8 and the chip antenna 5 is mounted on the fourth area 10.

Figure 5A:
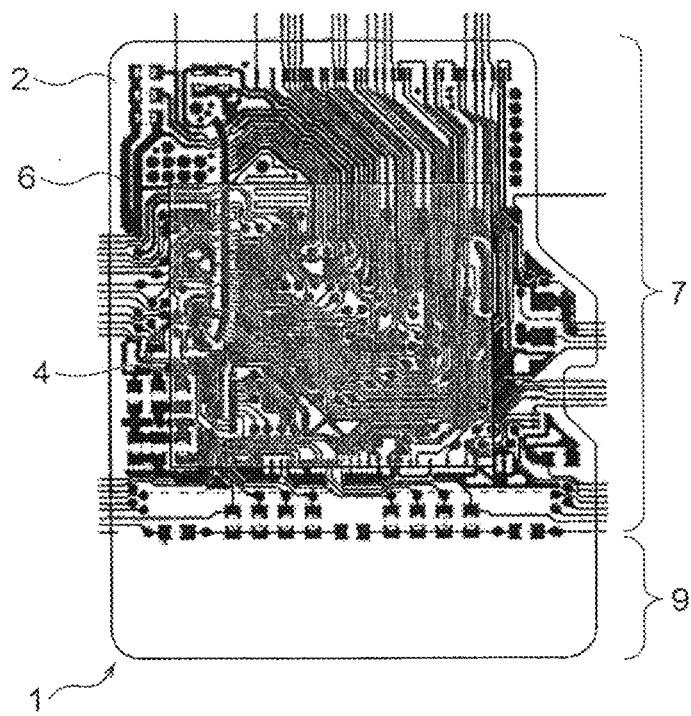
FIG. 5A is a layout diagram showing a second modification example of the mounting surface in FIG. 1A.
Figure 5B:
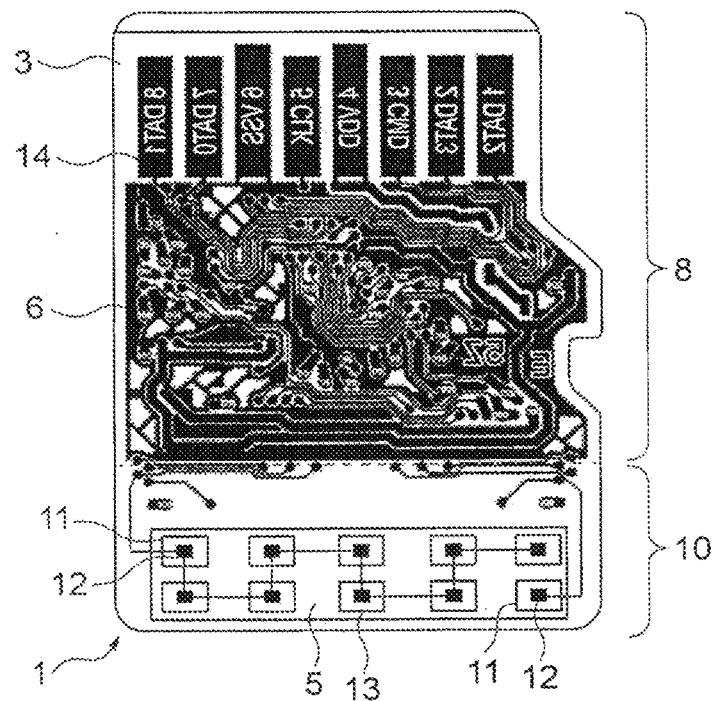
FIG. 5B is a layout diagram showing a second modification example of the mounting surface in FIG. 1B.

Further, as shown in FIGS. 5A and 5B, the memory chip 4 may be mounted on the first area 7 of the first mounting surface 2 and the chip antenna 5 may be mounted on the fourth area 10 of the second mounting surface 3.

Figure 6A:
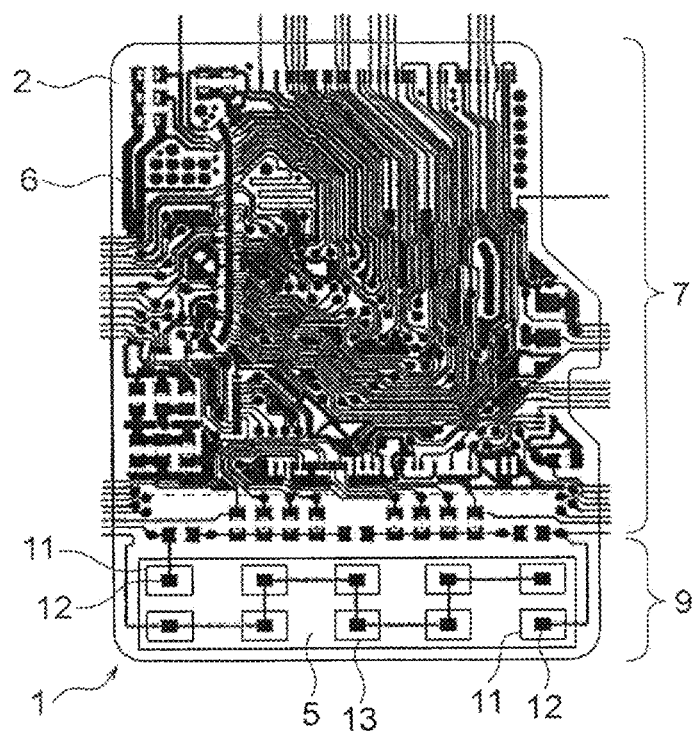
FIG. 6A is a layout diagram showing a third modification example of the mounting surface in FIG. 1A.
Figure 6B:
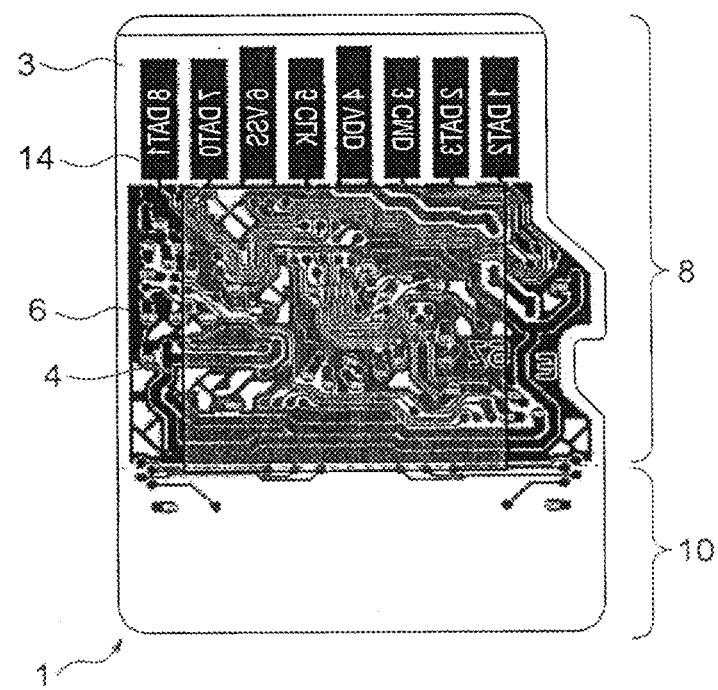
FIG. 6B is a layout diagram showing a third modification example of the mounting surface in FIG. 1B.

Still further, as shown in FIGS. 6A and 6B, the memory chip 4 may be mounted on the second area 8 of the second mounting surface 3 and the chip antenna 5 may be mounted on the third area 9 of the first mounting surface 2.

As described above, the chip antenna 5 of the present embodiment is mounted on the third area 9 of the first mounting surface 2 or the fourth area 10 of the second mounting surface 3, which are as remote areas as possible from the connectors 14 of the memory card 31 and an arrangement of conductive members such as the circuit pattern 6 on the third area 9 or the fourth area 10 is avoided as far as possible. Hence, the blockage of the magnetic flux emitted from the coil 21 in the chip antenna 5 can be prevented and the radio quality of the chip antenna 5 is enhanced. Thus when the electronic device 32 such as a cellular phone or a smart phone with the memory card 31 of the present embodiment inserted into the card slot 33 thereof is moved toward the communication device for proximity wireless communication from any directions, stable proximity wireless communication can be implemented.

(Second Embodiment)

The second embodiment relates to a configuration in which the memory chip 4 and chip antenna 5 are disposed to overlap each other.

Figure 7:
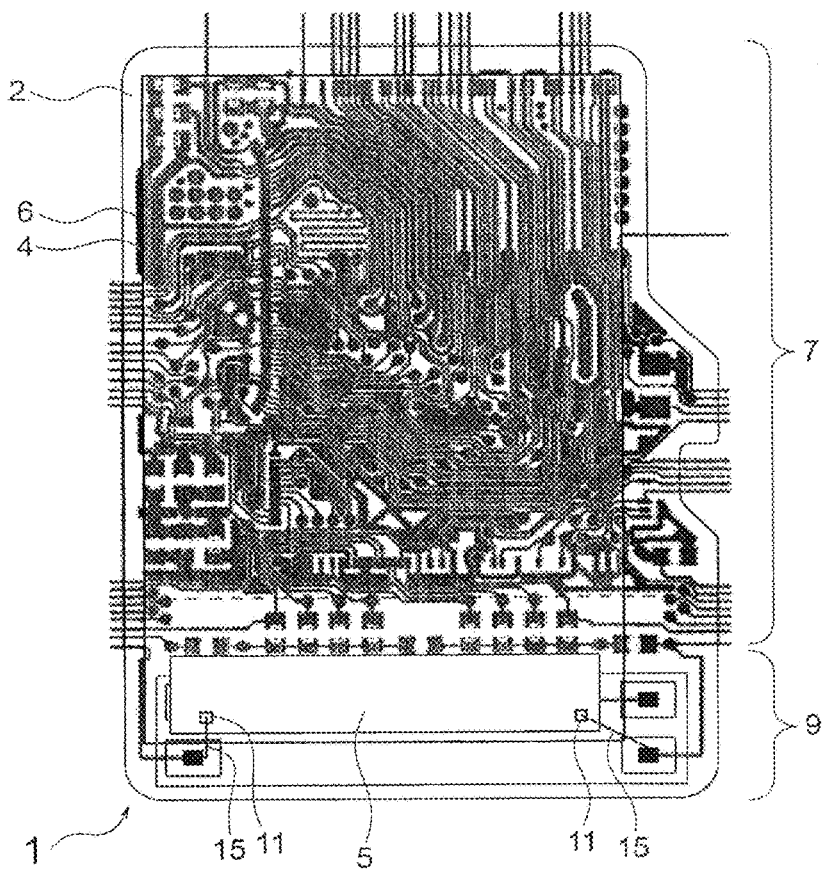
FIG. 7 is a layout diagram showing a first mounting surface of a substrate in a memory card of a second embodiment.

FIG. 7 is a layout diagram showing the first mounting surface 2 of the substrate 1 in the memory card 31 of the second embodiment. The layout diagram of the second mounting surface 3 is almost the same as FIG. 1B and thus is omitted.

The memory chip 4 mounted on the first mounting surface 2 in FIG. 7 is larger than the memory chip 4 of the first embodiment and is disposed to extend over the first area 7 and the third area 9 of the first mounting surface 2. The package of the memory chip 4 is formed of a resin member such as an epoxy resin and the magnetic flux from the coil 21 in the chip antenna 5 passes through the package. However, conductive members such as pins and the circuit pattern 6 are provided in the memory chip 4. These conductive members block the magnetic flux and therefore it is preferable that the arrangement of conductive members in the memory chip 4 on the third area 9 is avoided as far as possible. Since conductive members in the memory chip 4 are commonly disposed on the area near the center of the memory chip 4, it is considered that a resin member in the memory chip 4 is often disposed on the third area 9 near the end of the first mounting surface 2.

In the present embodiment, therefore, the chip antenna 5 is disposed on the third area 9 located on the end side of memory chip 4. To be specific, the chip antenna 5 is fixed with an adhesive on the upper surface of the memory chip 4, namely the surface opposite to the contacting surface between the memory chip 4 and the first mounting surface 2.

In the first embodiment, two terminals 12 for supplying electric power to the chip antenna 5 are connected with the pads of the circuit pattern 6, but in contrast in the present embodiment, the two terminals 12 are connected with the circuit pattern 6 on the first area 7 with bonding wires 15.

Part of the magnetic flux emitted from the coil 21 in the chip antenna 5 circulates in the thickness direction of the substrate 1; however since no conductive members such as the circuit pattern 6 basically exist on the third area 9 of the first mounting surface 2 and the fourth area 10 of the second mounting surface 3, there is no risk of the blockage of the magnetic flux. Thus, radio quality similar to the first embodiment can be obtained.

FIG. 7 shows an example in which both the memory chip 4 and the chip antenna 5 are mounted on the first mounting surface 2; however, the chip and the chip antenna 5 can be mounted on any one of the first mounting surface 2 and the second mounting surface 3.

Figure 8:
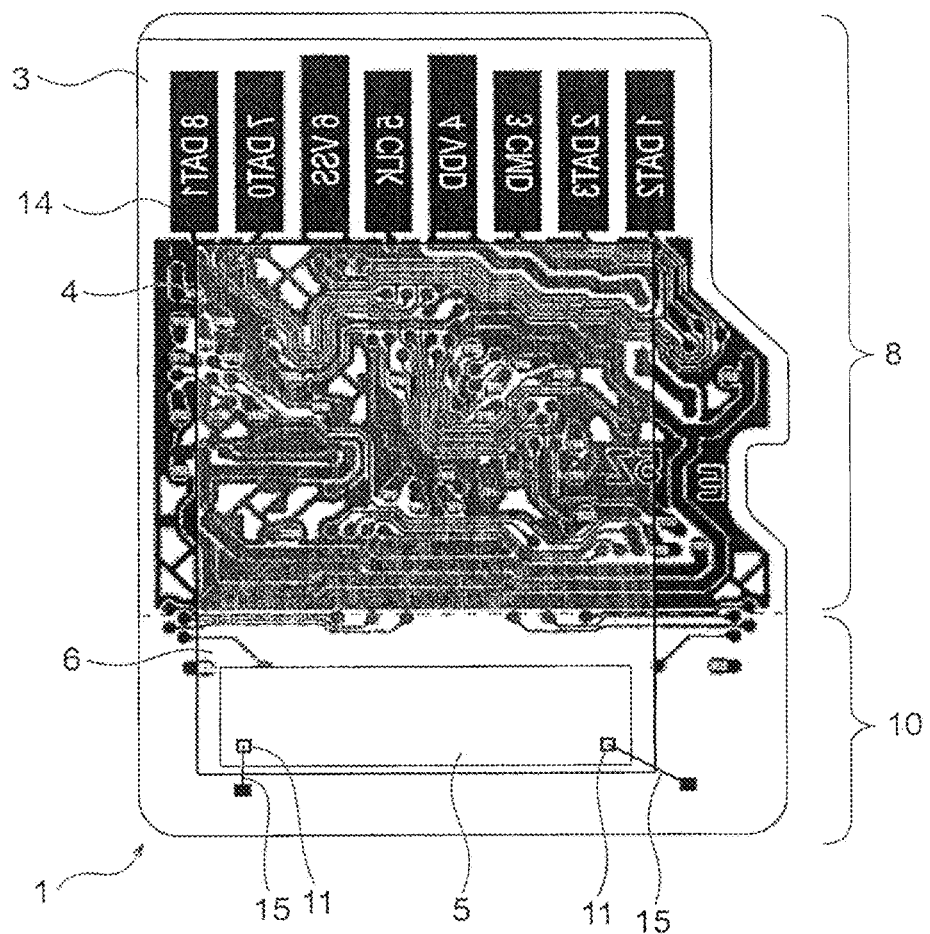
FIG. 8 is a layout diagram showing a first modification example of the mounting surface in FIG. 7.

FIG. 8 shows an example in which the chip is mounted so as to extend over the second area 8 and the fourth area 10 of the second mounting surface 3 and then the chip antenna 5 is mounted on the chip.

Figure 9A:
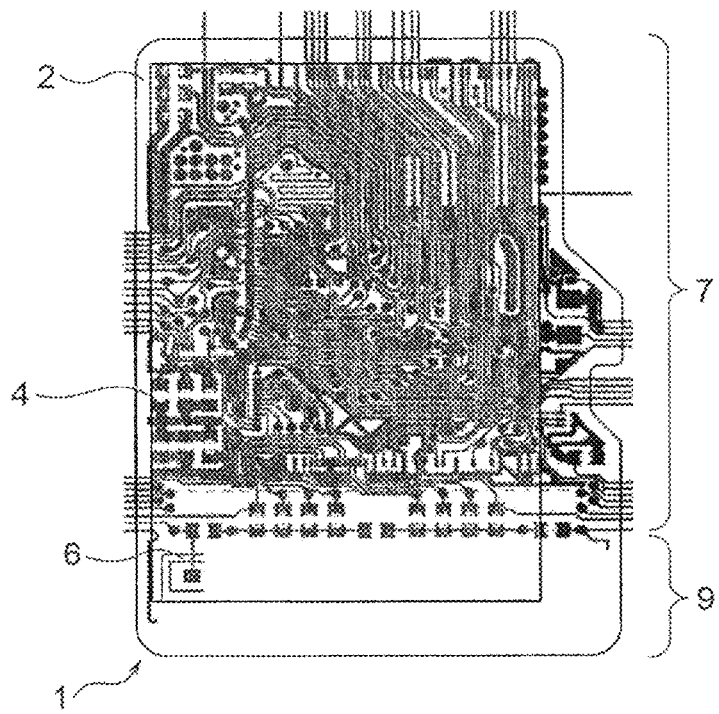
FIGS. 9A and 9B are layout diagrams showing a second modification example of the mounting surface in FIG. 7.
Figure 9B:
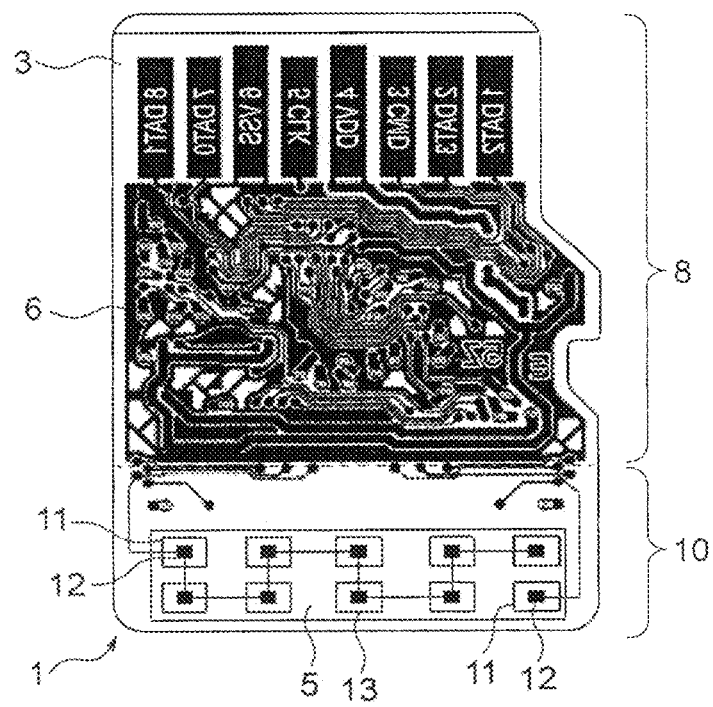

FIGS. 9A and 9B show an example in which the chip is mounted on the first mounting surface 2 and the chip antenna 5 is mounted on the fourth area 10 of the second mounting surface 3. Although the chip antenna 5 is connected with the first mounting surface 2 or the second mounting surface 3 with the bonding wires 15 in FIGS. 7 and 8, the pads 11 on the fourth area 10 are connected with the terminals 12 of the chip antenna 5 in FIG. 9B similarly to FIG. 1A.

Figure 10A:
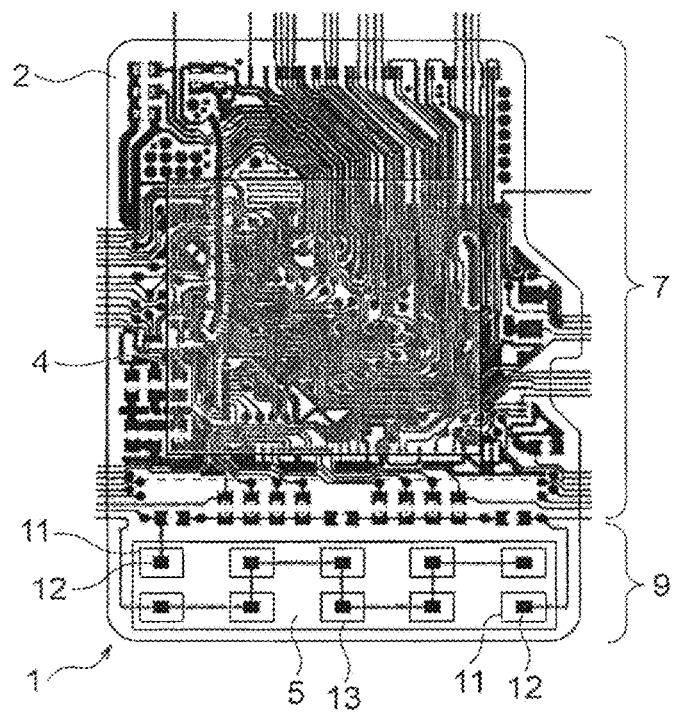
FIGS. 10A and 10B are layout diagrams showing a third modification example of the mounting surface in FIG. 7.
Figure 10B:
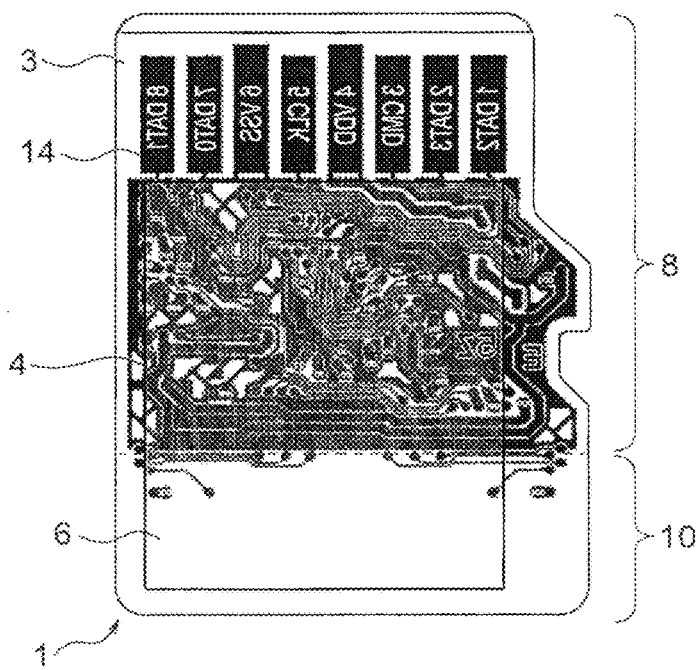

FIGS. 10A and 10B show an example in which the chip is mounted on the second mounting surface 3 and the chip antenna 5 is mounted on the third area 9 of the first mounting surface 2. In FIG. 10A similarly to FIG. 9B, the pads 11 on the third area 9 is connected with the terminals 12 of the chip antenna 5.

According to the second embodiment as described above, even if the size of the chip does not fit into the first area 7 or the second area 8, only if the conductive members in the chip do not overlap the third area 9 or the fourth area 10, the risk of blockage of the magnetic flux from the coil 21 in the chip antenna 5 is eliminated, and thus excellent radio quality can be obtained similarly to the first embodiment.

Several embodiments of the present invention are described; however these embodiments are presented as examples and not intended to restrict the scope of the invention. These new embodiments can be implemented in other various forms, and without departing from the spirit of the invention, various omissions, substitutions and modifications are allowed. These embodiments and modifications are included in the scope and the spirit of the invention as well as included in the scope of the invention and its equivalents set forth in the scope of patent claims.

The invention claimed is:

1. A memory card provided with a communication function, comprising:
   a substrate comprises:
      a first mounting surface; and
      a second mounting surface on a side opposite to the first mounting surface;
   a memory chip mounted on the first mounting surface or the second mounting surface;

a proximity wireless communication circuit on the first mounting surface or the second mounting surface;

a circuit pattern which is disposed on at least one of a first area of the first mounting surface and a second area of the second mounting surface located opposite to the first area, the substrate being between the first area and the second area, and which is connected with the memory chip and the proximity wireless communication circuit;

a chip antenna mounted on a third area which is disposed in a location different from the first area of the first mounting surface or a fourth area which is disposed in a location different from the second area of the second mounting surface and located opposite to the third area through the substrate, the chip antenna comprising a spiral pattern; and a dummy pad disposed on the third area or the fourth area on which the chip antenna is mounted and which is connected with the chip antenna.

2. The memory card of claim 1, further comprising:
two pads which are disposed on the third area or the fourth area on which the chip antenna is mounted and which are connected with the circuit pattern and connected respectively with two terminals configured to supply electric power to the chip antenna.

3. The memory card of claim 1,
wherein the memory chip is mounted on the first area of the first mounting surface, and
wherein the chip antenna is mounted on the third area of the first mounting surface or the fourth area of the second mounting surface.

4. The memory card of claim 1,
wherein the memory chip is mounted on the second area of the second mounting surface, and
wherein the chip antenna is mounted on the third area of the first mounting surface or the fourth area of the second mounting surface.

5. The memory card of claim 1,
wherein the memory chip is mounted so as to extend over the first area and the third area of the first mounting surface or to extend over the second area and the fourth area of the second mounting surface, and
wherein the chip antenna is mounted on the third area of the first mounting surface or the fourth area of the second mounting surface.

6. The memory card of claim 5,
wherein the chip antenna is adhered onto the memory chip, and
wherein the memory card comprises two bonding wires connecting respectively two terminals configured to supply electric power to the chip antenna with the circuit pattern.

7. The memory card of claim 1,
wherein a density of the circuit pattern in the third area and the fourth area are lower than a density of the circuit pattern in the first area and the second area.

8. The memory card of claim 7,
at least one circuit component is mounted on at least one of the first area and the second area except for the third area and the fourth area.

9. The memory card of claim 1, wherein
the substrate includes a long side and a short side perpendicular to the long side in plan view,
the connector is provided on the short side of the substrate,
the chip antenna is provided on the opposite side to the connector as viewed from a position of the memory chip in plan view, and
the chip antenna is provided on the opposite side to the connector as viewed from a position of the circuit pattern in plan view.

10. The memory card of claim 1, wherein
the substrate includes a long side and a short side perpendicular to the long side in plan view, and
the chip antenna includes a plurality of patterns disposed at a predetermined interval in parallel to the long side and a plurality of patterns disposed at a predetermined interval in a direction oblique to the long side and the short side.

11. The memory card of claim 1, wherein
a connector provided on at least one of the first mounting surface and the second mounting surface to be inserted in and removed from a card slot.

12. The memory card of claim 1, wherein
the third area is located on a side farther away from the connector than the first area, and
the fourth area is located on a side farther away from the connector than the second area.

13. The memory card of claim 1, wherein
the substrate comprises a long side and a short side extending in a direction crossing with the long side in plan view,
the spiral pattern comprises a first pattern extending in a first direction along the long side, a second pattern extending to a third direction oblique to the first direction and a second direction parallel to the short side, and a third pattern extending in a direction from the first mounting surface to the second mounting surface, the third pattern being connected to the first pattern and the second pattern.

* * * * *